A. TEITEL.
FILM CLEANING APPARATUS.
APPLICATION FILED SEPT. 27, 1919.

1,389,082.

Patented Aug. 30, 1921.
3 SHEETS—SHEET 1.

Inventor:
A. Teitel
By his Attorney Wm. H. Reid.

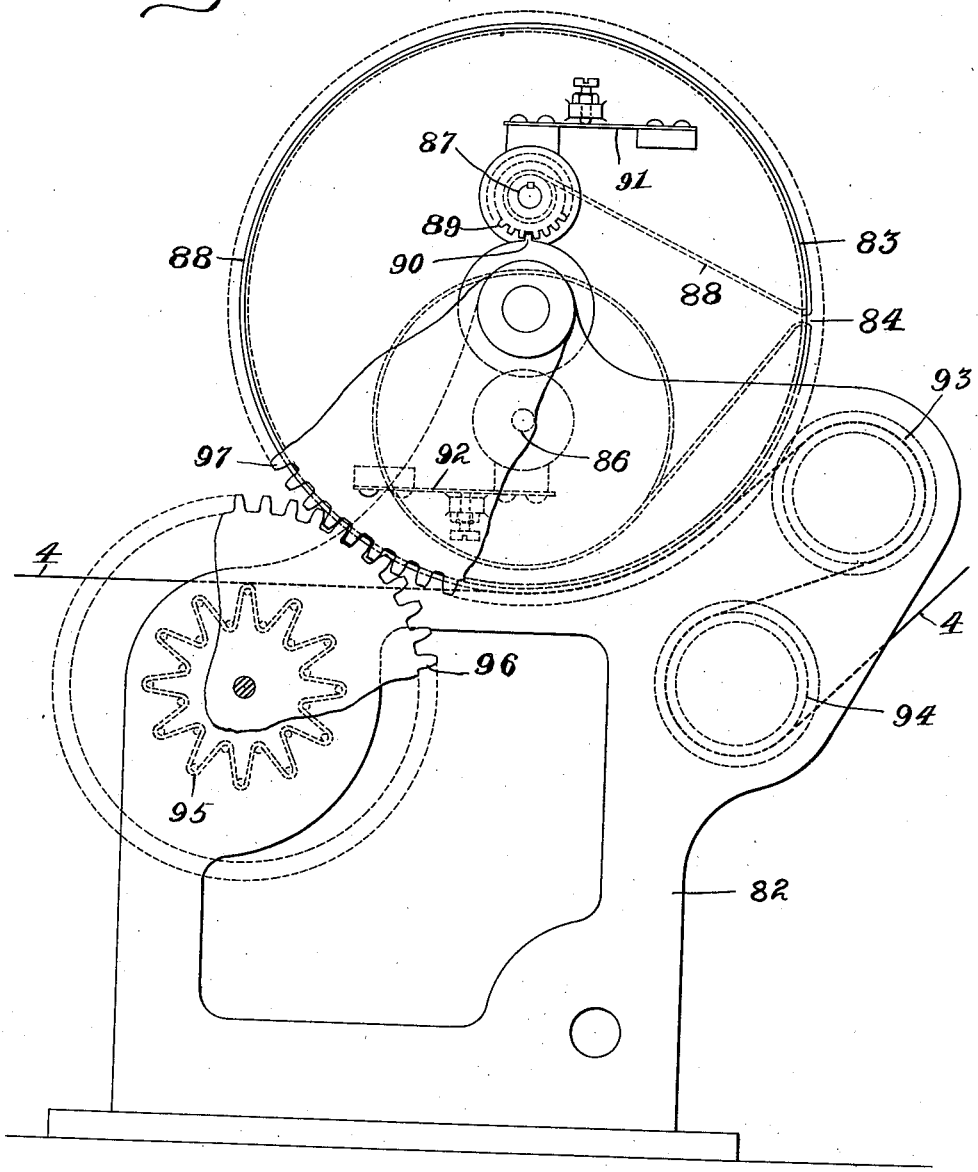

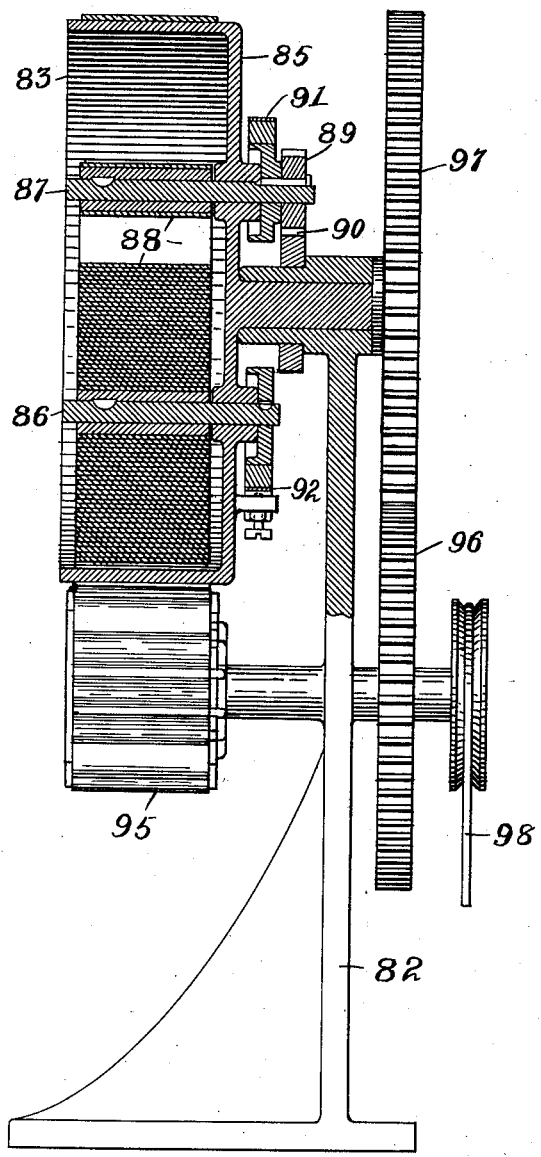

UNITED STATES PATENT OFFICE.

ALBERT TEITEL, OF NEW YORK, N. Y., ASSIGNOR TO CINEMA PATENTS COMPANY, OF CHICAGO, ILLINOIS, A PARTNERSHIP COMPOSED OF ALBERT TEITEL, ABE TEITEL AND JOHN LOEFFEL.

FILM-CLEANING APPARATUS.

1,389,082.     Specification of Letters Patent.     Patented Aug. 30, 1921.

Application filed September 27, 1919. Serial No. 326,829.

*To all whom it may concern:*

Be it known that I, ALBERT TEITEL, a citizen of the United States, and resident of New York, in the county of Bronx and State of New York, have invented certain new and useful Improvements in Film-Cleaning Apparatus, of which the following is a specification.

This invention has reference to apparatus for cleaning a flexible web of considerable length of any material, particularly the films of suitable flexible photographic material employed with motion picture machines, usually made of celluloid or paper.

The object of the present invention is to provide a form of apparatus that will automatically remove from the surface of the film, material of various forms that accumulates in the use of the film for projecting purposes or in the developing process, which apparatus will efficiently remove all foreign material from the film during the continuous and rapid passing of the film through the apparatus, yet will have no injurious action whatever upon the film, but restore it to its original condition.

In the accompanying drawings illustrating one embodiment of my invention, Figure 1 shows one of the web cleaning devices for the film, that advances the web.

Fig. 2 is an opposite view of the same.

Fig. 3 is a section on line 1—1 of Fig. 1.

Figure 1:
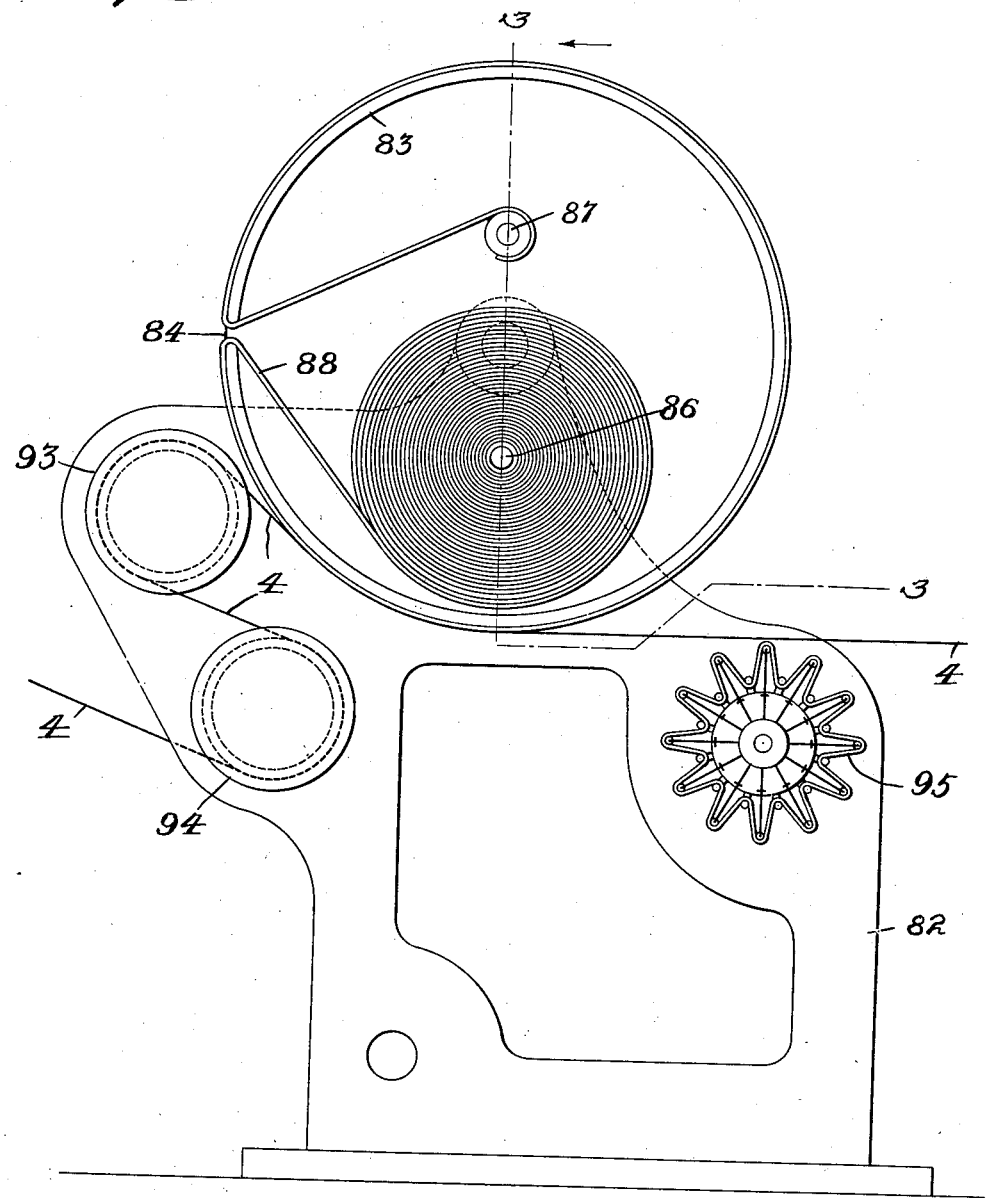

On a suitable frame 82 is mounted a rotatable drum 83 having a small transverse opening 84 in its periphery. One end of the drum is open, and the other end 85 serves to carry a roll 86, and also a roll 87 equidistant from the axis. A web 88 of suitable fabric or other flexible material is wound on the roll 86, and is then passed out through the opening 84, around the periphery of the drum, and the end passed in through the opening 84, and secured to the roll 87. Means are provided for turning this roll 87 as the drum rotates, that will obviously draw the web around the periphery of the drum and unwind it from the roll 86. A gear 89 is fast to the roll 87, and engages a single tooth 90 that is mounted stationary on the support of the drum. As the gear is carried around by the rotation, it will engage the fixed tooth 90 and advance the gear the distance of one tooth at each revolution of the drum. This will serve to wind the web from one spool to the other, passing around the periphery of the drum. Suitable brake arms 91 and 92 are provided on the drum to retard the movement of these rolls, as shown. Guide rolls 93 and 94 are provided on the frame 82 to direct the film 4, so that it will pass against the lower face of the drum. Beyond the drum, I also provide a buff roll 95 to retain the film against the drum.

It will thus be understood that I have provided a rotatable drum that carries means for supporting a cleaning web and which web is caused by the rotation of the drum to be advanced along the periphery of the drum to present renewed surfaces for engagement with a film that is brought to bear on the drum periphery as rotated; and which movement of the web is effected intermittently; and the holding means for the web on the drum will be retarded to prevent unwinding of the web except as necessary.

What I claim is:

1. In a film cleaning machine, a rotatable drum arranged to support a cleaning web on its periphery, and means arranged to move the web around the periphery of the drum for renewed engagement with the film, and which web movement is automatically effected by the rotation of the drum.

2. In a film cleaning machine, a rotatable drum arranged to support a cleaning web on its periphery, and means arranged to move the web around the periphery of the drum for intermittently renewed engagement with the film, and which web movement is automatically effected by the rotation of the drum.

3. In a film cleaning machine, a rotatable drum having a slot in its periphery, a pair of rolls carried by the drum arranged to have a cleaning web wound from one roll on to the other and which web can pass out said slot and around the periphery of the drum and back from the slot to the other roll, and means for causing rotation of one of said rolls by the rotation of the drum to move the web around the drum periphery as wound on said roll by said rotation thereof and unwound from the other roll, for renewed engagement with the film.

4. In a film cleaning machine, a rotatable drum arranged to support a cleaning web on its periphery, means for rotating the drum, means for drawing the film against a portion of the drum periphery, and means arranged to move the web around the periphery of the drum for renewed engagement with the film, and which web movement is automatically effected by the rotation of the drum.

5. In a film cleaning machine, a rotatable drum having a slot in its periphery, means for rotating the drum, means for drawing the film against a portion of the drum periphery, a pair of rolls carried by the drum arranged to have a cleaning web wound from one roll on to the other and which web can pass out said slot and around the periphery of the drum and back from the slot to the other roll, and means for causing rotation of one of said rolls by the rotation of the drum, to move the web around the drum periphery as wound on said roll by said rotation thereof and unwound from the other roll, for renewed engagement with the film.

6. In a film cleaning machine, a rotatable drum having a slot in its periphery, means for rotating the drum, means for drawing the film against a portion of the drum periphery, a pair of rolls carried by the drum arranged to have a cleaning web wound from one roll on to the other and which web can pass out said slot and around the periphery of the drum and back from the slot to the other roll, and means for causing rotation of one of said rolls by the rotation of the drum, to move the web around the drum periphery as wound on said roll by said rotation thereof and unwound from the other roll, for renewed engagement with the film.

7. In a film cleaning machine, the combination of a rotatable drum having a small slit in its periphery, means for advancing a film in contact with a portion of the drum periphery, a pair of rolls carried by the drum arranged to have a cleaning web wound from one roll to the other and to pass out said slot and around the periphery of the drum and back through the slot to the other roll, a gear on one of said rolls, a stationary tooth arranged to engage said gear on each revolution of the drum to advance the gear and roll one tooth distance whereby the web is advanced around the drum periphery.

8. In a film cleaning machine, the combination of a rotatable drum having a small slit in its periphery, means for advancing a film in contact with a portion of the drum periphery, a pair of rolls carried by the drum arranged to have a cleaning web wound from one roll to the other and to pass out said slot and around the periphery of the drum and back through the slot to the other roll, a gear on one of said rolls, a stationary tooth arranged to engage said gear on each revolution of the drum to advance the gear and roll one tooth distance whereby the web is advanced around the drum periphery, and a brake on each roll to retard its advance.

Signed at New York city, N. Y., on September 25th, 1919.

ALBERT TEITEL.